United States Patent
Shin

(10) Patent No.: US 12,469,185 B2
(45) Date of Patent: Nov. 11, 2025

(54) APPLICATION CUSTOMIZATION USING AN INTERFACE-GUIDED DIFFUSION MODEL

(71) Applicant: GOOGLE LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 210 days.

(21) Appl. No.: 18/334,936

(22) Filed: Jun. 14, 2023

(65) Prior Publication Data

US 2024/0419755 A1 Dec. 19, 2024

(51) Int. Cl.
| | |
|---|---|
| *G06T 11/00* | (2006.01) |
| *G06F 3/0483* | (2013.01) |
| *G06F 16/958* | (2019.01) |
| *G06F 40/40* | (2020.01) |
| *G06N 3/0475* | (2023.01) |

(52) U.S. Cl.
CPC ............ *G06T 11/00* (2013.01); *G06F 3/0483* (2013.01); *G06F 16/958* (2019.01); *G06F 40/40* (2020.01); *G06N 3/0475* (2023.01)

(58) Field of Classification Search
CPC ........ G06N 3/08; G06N 20/00; G06N 3/0475; G06F 3/0483; G06F 9/451; G06F 16/9577; G06F 16/958; G06F 3/04845; G06F 3/04847; G06F 8/38; G06F 40/40; G06T 11/00

See application file for complete search history.

(56) References Cited

U.S. PATENT DOCUMENTS

| | | | | |
|---|---|---|---|---|
| 2019/0317739 | A1* | 10/2019 | Turek | G06N 3/045 |
| 2021/0303318 | A1* | 9/2021 | Raghavan | G06F 40/279 |
| 2023/0112710 | A1 | 4/2023 | Huang et al. | |
| 2023/0409298 | A1* | 12/2023 | Ciminelli | G06V 30/422 |
| 2024/0127457 | A1* | 4/2024 | Jain | G06V 30/41 |
| 2024/0169623 | A1* | 5/2024 | Zeng | G06T 11/60 |

OTHER PUBLICATIONS

Jialiang Wei et al., Boosting GUI Prototyping with Diffusion Models, https://arxiv.org/abs/2306.06233, Jun. 9, 2023 (Year: 2023).*
Jason Wu et al., WebUI: A Dataset for Enhancing Visual UI Understanding with Web Semantics, https://arxiv.org/abs/2301.13280, Jan. 30, 2023 (Year: 2023).*
Zhang, et al., "Adding Conditional Control to Text-to-Image Diffusion Models", arXiv:2302.05543 (https://arxiv.org/abs/2302.05543), Feb. 10, 2023, 33 pages.
International Search Report & Written Opinion for PCT Application No. PCT/US2024/033262, mailed on Oct. 7, 2024, 16 pages.

* cited by examiner

*Primary Examiner* — Nicholas Ulrich
(74) *Attorney, Agent, or Firm* — Brake Hughes Bellermann LLP

(57) ABSTRACT

According to an aspect, a method may include generating, by an interface-guided diffusion model, a UI-compatible output image in response to one or more prompts including user-generated text and input condition data. The input condition data includes user interface (UI) layout information about at least one UI element included in an interface of an application. The method includes providing the UI-compatible output image to the application.

19 Claims, 11 Drawing Sheets

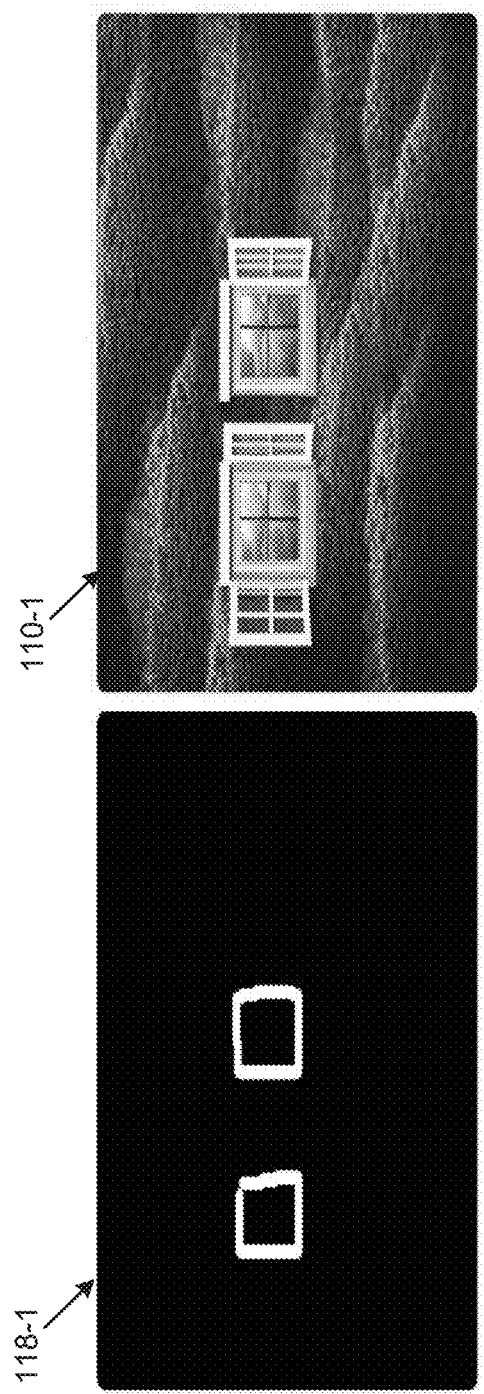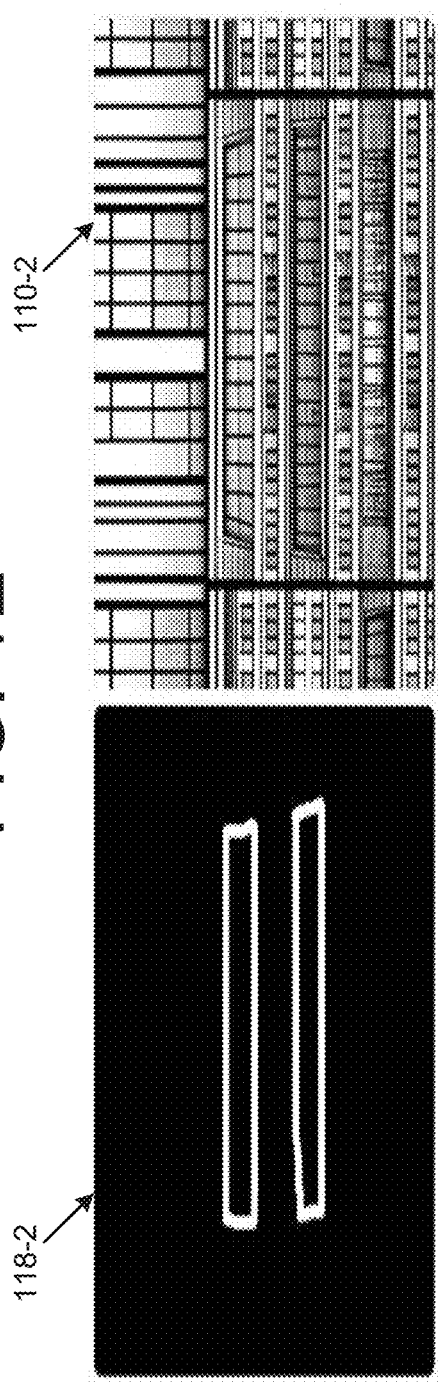
FIG. 1E
FIG. 1F

APPLICATION CUSTOMIZATION USING AN INTERFACE-GUIDED DIFFUSION MODEL

BACKGROUND

Customizations to conventional browser applications may be limited. For example, a user may select a particular image from images having predefined formats, conforming to technical requirements related to vision deficiencies of users, for use within a user interface of a browser tab.

SUMMARY

This disclosure relates to a system that uses an interface-guided diffusion model to convert user-generated text into a UI-compatible output image for use in an interface of an application. A UI-compatible output image may be an image, which, in some examples, is usable as a background of the application's interface, where the interface includes one or more UI elements arranged according to a UI layout. The system may use UI layout information of the interface as an input condition to generate a UI-compatible output image that accounts for the UI elements, which may increase the discoverability of UI elements on the interface. For example, the interface-guided diffusion model may select particular color sequences, sizes and/or shapes of objects, and/or other design elements that may increase the discoverability of the UI elements when the UI-compatible output image is applied to the interface.

In some aspects, the techniques described herein relate to a method including: generating, by an interface-guided diffusion model, a UI-compatible output image in response to one or more prompts including user-generated text and input condition data, the input condition data including user interface (UI) layout information about at least one UI element included in an interface of an application; and providing the UI-compatible output image to the application.

In some aspects, the techniques described herein relate to a non-transitory computer-readable medium storing executable instructions that when executed by at least one processor cause the at least one processor to execute operations, the operations including: generating input condition data including user interface (UI) layout information about at least one UI element included in an interface of an application; providing one or more prompts to an interface-guided diffusion model, the one or more prompts including user-generated text and the input condition data; receiving a UI-compatible output image from the interface-guided diffusion model; and applying the UI-compatible output image to the interface.

In some aspects, the techniques described herein relate to an apparatus including: at least one processor; and a non-transitory computer-readable medium storing executable instructions that cause the at least one processor to: receive one or more prompts that includes user-generated text and input condition data, the input condition data including user interface (UI) layout information about at least one UI element included in an interface of an application; in response to the one or more prompts, generate a UI-compatible output image; and provide the UI-compatible output image to the application.

The details of one or more implementations are set forth in the accompanying drawings and the description below.

Other features will be apparent from the description and drawings, and from the claims.

BRIEF DESCRIPTION OF THE DRAWINGS

FIG. 1E illustrates an example of a UI-compatible output image that was generated to account for UI elements in an interface according to an aspect.

FIG. 1F illustrates an example of a UI-compatible output image that was generated to account for UI elements in an interface according to another aspect.

DETAILED DESCRIPTION

Figure 1A:
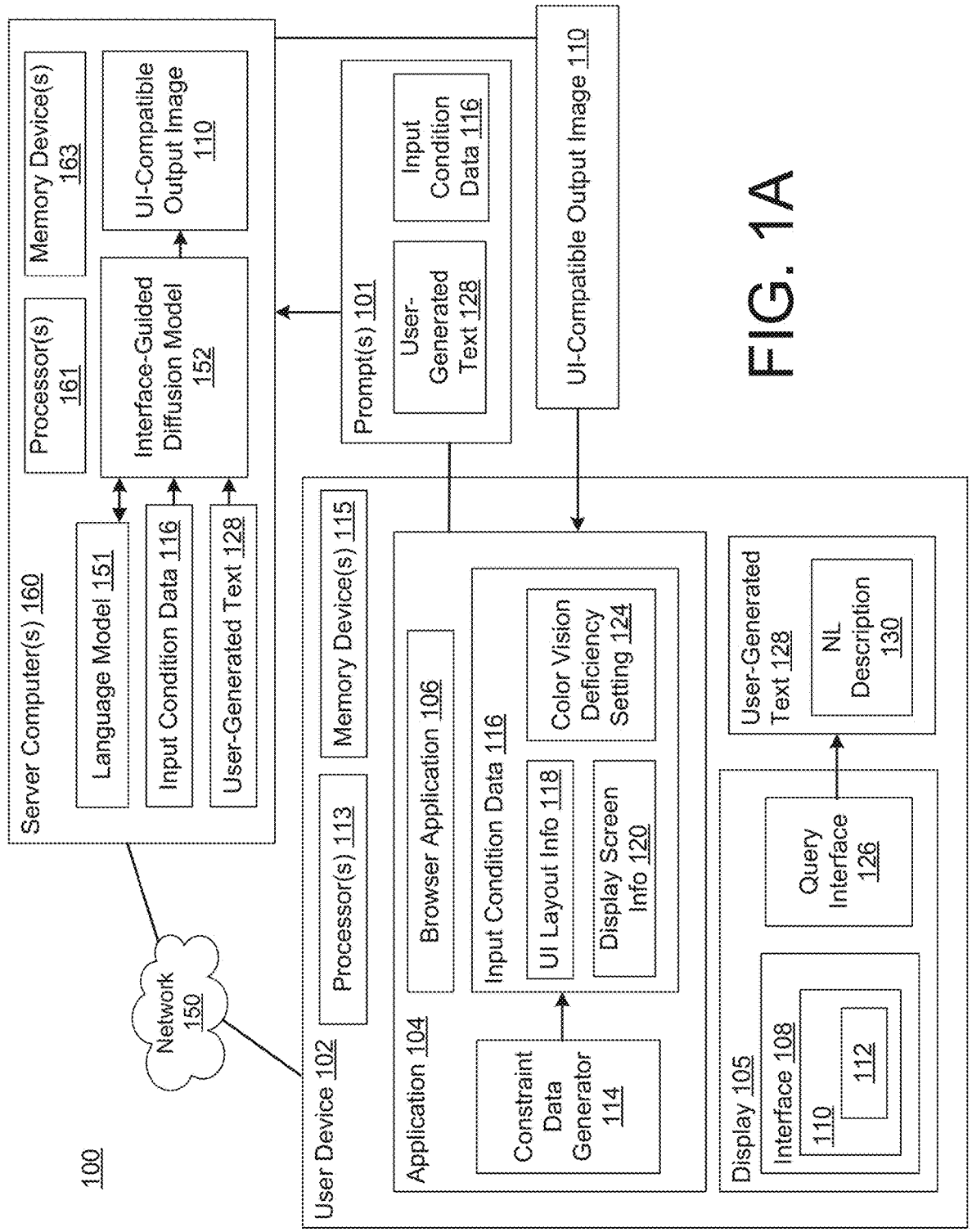
FIG. 1A illustrates a system that uses an interface-guided diffusion model to generate a UI-compatible output image according to an aspect.

This disclosure relates to a system that may convert user-generated text into a UI-compatible output image for use on an interface of an application. The application may be a browser application. The interface may be a new tab page within a browser tab. The interface may be an interface for a web application that runs in a browser tab. In some examples, the application is an operating system or a native application executable by the operating system. For example, implementations can generate wallpaper (e.g., a background image) for a desktop/home screen of the operating system. The system includes an interface-guided diffusion model capable of receiving one or more prompts that include user-generated text (e.g., a natural language description about an image to be created) and input condition data about one or more constraints relating to the image generation. The input condition data may include user interface (UI) layout information about UI elements on the interface. In some examples, the interface-guided diffusion model is a diffusion model that generates a UI-compatible output image based on the user-generated query and the UI layout information, where the generation of the UI-compatible output image is influenced (or guided) by the existing UI elements on the interface. In some examples, the interface-guided diffusion model is a specific diffusion model that generates a UI-compatible output image based on the user-generated query and the UI layout information, where the generation of the UI-compatible output image is influenced (or guided) by the existing UI elements on the interface.

According to some conventional approaches, if a generative image is incorporated into an application's interface, the image data may interfere with the visibility of the UI elements. However, the system discussed herein may use UI layout information of the interface as an input condition to generate a UI-compatible output image that accounts for the UI elements, which may increase the discoverability of UI elements on the interface. Further, a visually impaired user may find it relatively difficult to use the application's interface when a conventional generative ML image is used in the interface because the image data may obscure the UI elements' boundaries, thereby making it more difficult to find and locate UI elements on a display. For example, the generative ML image may not be designed or formatted to the application's interface, which may cause the image data to interfere with the visibility of the UI elements. However, the interface-guided diffusion model may not only generate an output image that avoids visual interference with the UI elements, such as a model can also generate the UI-compatible output image with a monochromatic color scheme that accounts for the UI elements, which may increase the visibility of the UI elements for a vision impaired user. In some examples, a UI-compatible output image is generated based on a color palette designed to increase contrast and improve perception of the output image when viewed by colorblind users. These and other features are further explained with reference to the figures.

FIGS. 1A through 1F illustrate a system 100 that uses an interface-guided diffusion model 152 to convert user-generated text 128 into a UI-compatible output image 110 for use in an interface 108 of an application 104. A UI-compatible output image 110 is, for example, an image that is usable as a background of an application's interface 108, where the interface 108 includes one or more UI elements 112 arranged according to a UI layout. A UI-compatible output image 110 may preserve or even increase visibility of the UI elements 112 when arranged according to the layout, so that overall usability of the interface 108 when displayed with the UI-compatible output image 110 remains unaffected or is even improved. The system 100 discussed herein may overcome one or more technical problems relating to the use of generative machine-learning (ML) images within an application's interface 108 that includes UI elements 112 (e.g., icons, controls, input fields, etc.) that are positioned in fixed locations in the interface 108. According to some conventional approaches, if a generative image is incorporated into an application's interface 108 (e.g., used as a background), the image data may interfere with the visibility of the UI elements 112. However, the system 100 discussed herein may use UI layout information 118 of the interface 108 as an input condition to generate a UI-compatible output image 110 that accounts for the UI elements 112, which may increase the discoverability of UI elements 112 on the interface 108. For example, the interface-guided diffusion model 152 may select particular color sequences, sizes and/or shapes of objects, and/or other design elements that may increase the discoverability of the UI elements 112 when the UI-compatible output image 110 is applied to the interface 108.

Further, a visually impaired user may find it relatively difficult to use the application's interface 108 when a conventional generative ML image (e.g., even a black and white image) is used in the interface 108 because the image data may obscure the UI elements' boundaries, thereby making it more difficult to find and locate UI elements 112 on a display 105. For example, the generative ML image may not be designed or formatted to the application's interface 108, which may cause the image data to interfere with the visibility of the UI elements 112. However, the interface-guided diffusion model 152 may use the activation of a color vision deficiency setting 124 as a constraint, which causes the interface-guided diffusion model 152 to generate the UI-compatible output image 110 with a monochromatic color scheme that accounts for the UI elements 112, which may increase the visibility of the UI elements 112 for a vision impaired user.

According to the techniques discussed herein, the application 104 may generate one or more prompts 101 that include user-generated text 128 and input condition data 116. A user-generated text 128 is a text that is provided as input by a user and that is a textual characterization of the UI-compatible output image 110. In some examples, the user-generated text 128 includes a natural language description 130 about an image to be created. The input condition data 116 may include UI layout information 118 about the application's interface 108, display screen information 120 about one or more attributes of the device's display 105, and/or activation of a color vision deficiency setting 124. In response to the prompt(s) 101, the interface-guided diffusion model 152 may generate a UI-compatible output image 110 that is guided (or influenced) by the shape and positions of the UI elements 112 on the interface 108, and, in some examples, may be constrained to other types of input conditions represented by the input condition data 116. The interface-guided diffusion model 152 may provide the UI-compatible output image 110 to the application 104, which causes the application 104 to apply the UI-compatible output image 110 to the interface 108 such that discovery of the UI elements 112 is increased.

The application 104 may be any type of application executable by a user device 102. In some examples, the application 104 is a browser application 106. The browser application 106 is a web browser configured to render browser tabs in the context of one or more browser windows. A browser tab may display content (e.g., web content) associated with a web document (e.g., webpage, PDF, images, videos, etc.) and/or an application such as a web application, a progressive web application (PWA), and/or an extension. A web application may be an application program that is stored on a remote server (e.g., a web server) and delivered over the network 150 through the browser application 106. In some examples, a progressive web application is similar to a web application but can also be stored (at least in part) on the user device 102 and used offline. An extension adds a feature or function to the browser application 106. In some examples, an extension may be hypertext markup language (HTML), cascading style sheet (CSS), and/or JavaScript based (for browser-based extensions). In some examples, the application 104 is an operating system of the user device 102. In some examples, the application 104 is a native application (e.g., non-browser application) installed on the operating system of the user device 102.

The application 104 may render an interface 108 on a display 105 of the user device 102. The interface 108 is a user interface that enables the user to interact with the functionalities of the application 104. The interface 108 may be a hypertext markup language (HTML) document. The interface 108 includes one or more UI elements 112. The UI elements 112 may be UI elements that are positioned in predefined locations on the interface 108. The UI elements 112 may include application icons, input fields, user controls, and/or menu items, etc. Some of the UI elements 112 may have different sizes and/or shapes than other UI elements 112. In some examples, the shape, location, and position of the UI elements 112 are defined by an application developer of the application 104. In some examples, the UI elements 112 are movable by the user (e.g., a user may move a UI element 112 from one location on the interface 108 to another location).

Figure 1B:
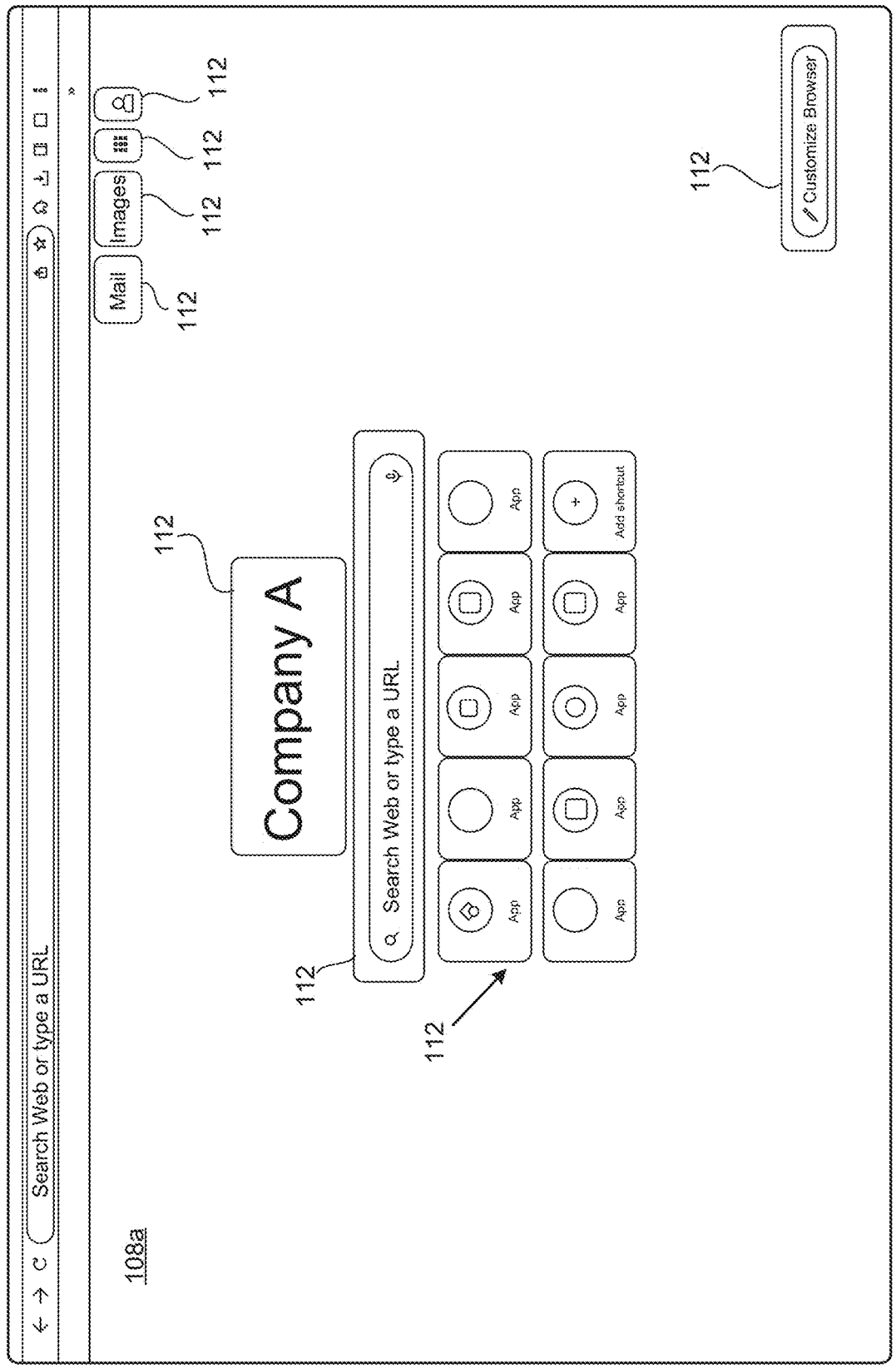
FIG. 1B illustrates an example of an interface of an application according to an aspect.

In some examples, the interface 108 is a new tab page 108a of a browser tab, as shown in FIG. 1B. For example, when a user launches the browser application 106 (or creates a new browser tab), the browser application 106 may display a new browser tab with a new tab page 108a. In some examples, the new tab page 108a is also referred to as a start page or a homepage. The new tab page 108a may include a plurality of UI elements 112 that are positioned at predefined locations. For example, the UI elements 112 may include an input field (e.g., a search field), application icons (which, when selected, launches an application), user controls, menu items, and/or a user profile icon, etc. However, it is noted that the interface 108 may be any type of user interface of an application 104. For example, the interface 108 may be an operating system interface and/or an interface associated with a particular native application, etc.

The application 104 may also render a query interface 126 on the display 105. The query interface 126 may receive user-generated text 128 for generating UI-compatible output images 110. The user-generated text 128 may include a natural language description 130 about the generation of a UI-compatible output image 110. In some examples, the query interface 126 is a UI element 112 in the interface 108. In some examples, the query interface 126 is overlaid on top of the interface 108. In some examples, the query interface 126 is an interface that is separate from the interface 108. In some examples, the query interface 126 is included in a setting interface of the application 104. In some examples, the query interface 126 is an interface of an application (e.g., a language model extension to the browser application 106) configured to communicate with the application 104 and the interface-guided diffusion model 152 (and, in some examples, a language model 151). If the language model extension is added (e.g., installed, downloaded, etc.) to the browser application 106, the language model extension adds the UI-compatible image generation feature to the browser application 106.

In some examples, the query interface 126 includes a chat interface that displays the textual queries and responses from the interface-guided diffusion model 152. In some examples, the query interface 126 includes a chat interface associated with a general large language model (e.g., language model 151), and the language model 151 communicates with the interface-guided diffusion model 152 to obtain a UI-compatible output image 110. In some examples, the interface-guided diffusion model 152 is a sub-component of the language model 151. The application 104 and the interface-guided diffusion model 152 (and, in some examples, the language model 151) are configured to communicate with each other via an application programming interface (API) and/or other communication protocols such as inter-process communication (IPC) or a remote procedure call (RPC).

A user may enter, via the query interface 126, user-generated text 128 (e.g., "create an image of trees having wet leaves") about an image to be generated. In response to submission of the user-generated text 128, the application 104 may transmit a prompt 101 to the interface-guided diffusion model 152. The prompt 101 may include the user-generated text 128. In some examples, the prompt 101 includes input condition data 116 generated by the application 104. In some examples, the application 104 generates a first prompt that includes the user-generated text 128 and a second prompt that includes the input condition data 116.

The input condition data 116 may include information about one or more input conditions (or controls) for generating images from the interface-guided diffusion model 152. The input condition(s) are provided to the interface-guided diffusion model 152 as input(s) that influence generation of the UI-compatible output image 110. In some examples, the input condition(s) include one or more task-specific input condition(s) that are learned by the interface-guided diffusion model 152 during a training period. In some examples, the input condition data 116 includes UI layout information 118 about one or more UI elements 112 included in the interface 108 of the application 104. In response to the prompt(s) 101, the interface-guided diffusion model 152 may generate the UI-compatible output image 110 according to the user-generated text 128 while being constrained according to the UI layout information 118. Using the UI layout information 118 as a constraint to the interface-guided diffusion model 152 may cause the interface-guided diffusion model 152 to output UI-compatible output images 110 that may increase the discoverability of the UI elements 112 on the interface 108. For example, the interface-guided diffusion model 152 may select particular color sequences, sizes and/or shapes of objects, and/or other design elements that may increase the discoverability of the UI elements 112. The interface-guided diffusion model 152 may provide (e.g., transmit) the interface-guided diffusion model 152 to the application 104 for display in the interface 108.

The application 104 may include a constraint data generator 114 configured to generate the UI layout information 118. The UI layout information 118 may include information about the interface 108 of the application 104. In some examples, the UI layout information 118 may include information (e.g., metadata, UI edge map data, and/or image data) that indicates a size and/or location of a UI element 112 in the interface 108. In some examples, the UI layout information 118 may include a UI edge map 134. In some examples, a UI edge map 134 may identify simplified representations (e.g., boxes) of UI elements 112 on an interface 108 and/or may include information about positions and shapes of the UI elements 112.

Figure 1C:
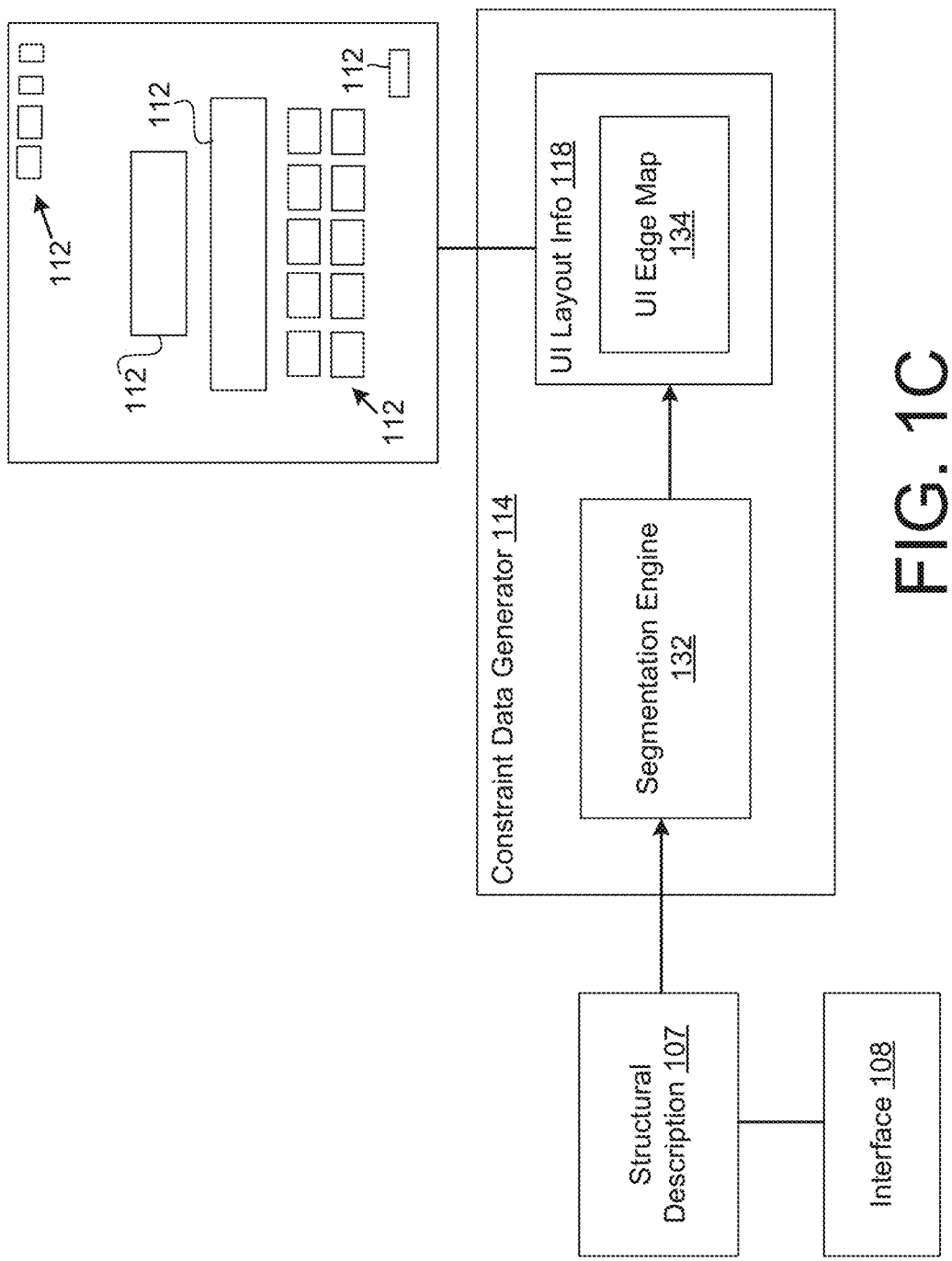
FIG. 1C illustrates an example of a constraint data generator for generating UI layout information according to an aspect.

In some examples, as shown in FIG. 1C, the constraint data generator 114 includes a segmentation engine 132 configured to generate the UI layout information 118 from a structural description 107 of the interface 108. In some examples, the structural description 107 includes the code (e.g., hypertext markup language (HTML) code) of the interface 108. In some examples, the structural description 107 includes a structure that organizes the UI elements 112 of the interface 108. In some examples, the structural description 107 includes a document object model (DOM) tree. In some examples, the segmentation engine 132 may detect a size and position of a boundary (e.g., a bounding box) of a UI element 112 on the interface 108. In some examples, the UI layout information 118 includes coordinates (e.g., X, Y coordinates) of a UI element 112 and a size value (e.g., length and width) of a UI element 112.

In some examples, the constraint data generator 114 may generate display screen information 120 about a user device 102 or a display 105 that is used by the interface 108. In some examples, the constraint data generator 114 may obtain a device identifier associated with the user device 102 and may use the device identifier to identify one or more display screen attributes of the display 105. The display screen attributes may include resolution, color accuracy, contrast ratio, viewing angle, refresh rate, response time, brightness, size and display ratio, and/or panel technology (e.g., liquid crystal display (LCD), organic light-emitting diode (OLED), active-matrix organic light-emitting diode (AMOLED), etc.). In some examples, the constraint data generator 114 may generate the display screen information 120 to include one or more display screen attributes and include the display screen information 120 in the input condition data 116. The interface-guided diffusion model may generate the UI-compatible output image 110 using one or more of the display screen attributes to optimize the UI-compatible output image 110 for the display 105.

In some examples, the application 104 may include a color vision deficiency setting 124, which, when activated, causes the application's interface 108 to limit the color scheme to one or more colors (e.g., black and white, a color palate accessible to people with a vision deficiency such as color blindness). In some examples, a visually impaired user may find it relatively difficult to use the application's interface when the user selects their own background (even a black and white image) because the background image may obscure the UI elements' boundaries, thereby making it more difficult to find and locate UI elements 112 on the display 105. However, the interface-guided diffusion model 152 may use the activation of the color vision deficiency setting 124 as a constraint, which causes the interface-guided diffusion model 152 to generate the UI-compatible output image 110 with a monochromatic color scheme. For example, the input condition data 116 may also include activation of a color vision deficiency setting 124. The constraint data generator 114 may determine whether or not the color vision deficiency setting 124 is activated, and, if so, may include information to limit the color scheme to a monochromatic color scheme. When included in the input condition data 116, the interface-guided diffusion model 152 may generate a UI-compatible output image 110 with a monochromatic color scheme such that visibility of the UI elements 112 is increased.

In some examples, the interface-guided diffusion model 152 is a text-to-image ML model capable of receiving one or more prompts 101 that include the user-generated text 128 and the input condition data 116. The interface-guided diffusion model 152 includes a text-to-image machine-learning (ML) model. The interface-guided diffusion model 152 may include one or more neural network blocks, where each neural network block may include one or more layers. In some examples, a neural network block and a layer may be used interchangeably. In some examples, a neural network block defines a more general architecture, where the neural network block includes multiple layers. A neural network block (or layer) may refer to a functional unit that performs a specific computation on the input data. A neural network block (or layer) may include a group of interconnected neurons (e.g., nodes) that receive input, apply weights to those inputs, and pass the results through an activation function to produce output values. The interface-guided diffusion model 152 may include a combination of neural network blocks associated with natural language processing and computer vision processing. The interface-guided diffusion model 152 may include a text embedding layer. The interface-guided diffusion model 152 may include one or more convolution layers. The interface-guided diffusion model 152 may include a transpose convolution layer. The interface-guided diffusion model 152 may include a recurrent layer. The interface-guided diffusion model 152 may include a transform layer. The interface-guided diffusion model 152 may include one or more generative adversarial network (GAN) components.

Figure 1D:
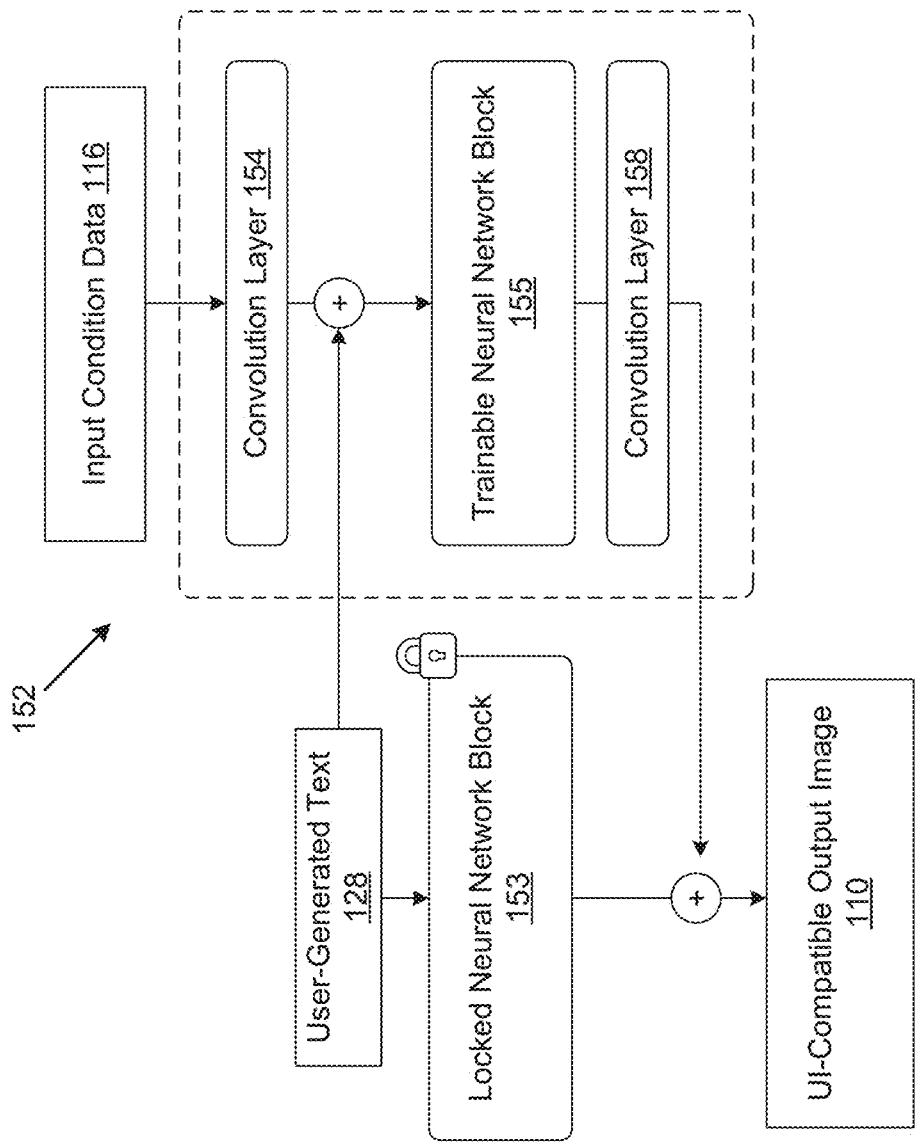
FIG. 1D illustrates an example of an interface-guided diffusion model according to an aspect.

In some examples, the interface-guided diffusion model 152 is a specifically-configured ML model that has been trained to learn one or more input conditions. In some examples, the interface-guided diffusion model 152 includes a neural network configured to control diffusion models using the input condition data 116. In some examples, as shown in FIG. 1D, the interface-guided diffusion model 152 may include a locked neural network block 153 and a trainable neural network block 155, where the weights of the locked neural network block 153 are copied and transferred to the trainable neural network block 155. The locked neural network block 153 may represent a large pre-trained text-to-image ML model. The trainable neural network block 155 and locked neural network block 153 are connected with a convolution layer 154 and a convolution layer 158, where the convolution weights progressively grow from zeros to optimized parameters in a learned manner. In some examples, the convolution layer 154 includes a 1×1 convolution. In some examples, the convolution layer 154 includes a 1×1 convolution with weight and bias initialized as zeroes.

The trainable neural network block 155 is trained using training input condition data (e.g., training input condition data 216 of FIG. 2) to learn the input condition(s) (e.g., the UI layout information 118, display screen information 120, limited color scheme indicated by the color vision deficiency setting 124, etc.) and the locked neural network block 153 may preserve the weights of the neural network. At runtime, the interface-guided diffusion model 152 may receive the input condition data 116. In some examples, the UI layout information 118, the display screen information 120, and/or the color vision deficiency setting 124 from the prompt(s) 101 received from the application 104. In some examples, the interface-guided diffusion model 152 may obtain one or more of the portions of the input condition data 116 from information stored on one or more servers associated with the application 104. In some examples, the interface-guided diffusion model 152 may obtain the UI layout information 118 from a resource address (e.g., resource locator, a universal resource locator (URL)) associated with the interface 108 included in the prompt(s) 101. The convolution layer 154 may apply a convolution with the learned parameters to the input condition data 116. Then, the input condition data 116 is combined with the user-generated text 128 and inputted into the trainable neural network block 155. The convolution layer 158 may apply a convolution to the output of the trainable neural network block 155, thereby producing the UI-compatible output image 110.

Referring to FIG. 1E, the interface-guided diffusion model 152 may receive UI layout information 118-1 about a first interface as an input condition and generate a UI-compatible output image 110-1 that is influenced by the position and size of the UI elements in the first interface. As shown in FIG. 1E, the UI-compatible output image 110-1 has image data (e.g., windows) with a position and a size that corresponds to the UI elements in the first interface. Referring to FIG. 1F, the interface-guided diffusion model 152 may receive UI layout information 118-2 about a second interface as an input condition and generate a UI-compatible output image 110-2 that is influenced by the position and size of the UI elements in the second interface. The interface-guided diffusion model 152 may select particular color sequences, sizes and/or shapes of objects, and/or other design elements that may increase the discoverability of the UI elements in the first interface and the second interface. In some examples, the interface-guided diffusion model 152 may select colors compatible with a color scheme defined for the interface 108 (e.g., compatible with, inspired by, based on, a CSS associated with the interface 108). For example, the interface-guided diffusion model 152 may use the CSS (or other color palette) for generating the UI-compatible output image 110 so that the image includes complimentary colors.

In some examples, the system 100 is a web page design system. For example, the designer of a web page may wish to replace a solid background color of the web page with a suitable background image to improve usability and appeal of the web page. The technology described herein enables the designer to quickly generate a background image usable and compatible with the existing UI, its layout and components. In conventional systems, a designer may have chosen a stock image and would have to rearrange the layout and UI components to fit to the stock image designated for use as a background of the web page. It is apparent that such a conventional procedure of incorporating a background image requires more work on behalf of the UI designer and may not preserve design criteria and usability of the original web page.

The user device 102 may be any type of computing device that includes one or more processors 113, one or more memory devices 115, a display 105, and an operating system configured to execute (or assist with executing) one or more applications. In some examples, the operating system is the application 104. In some examples, the application 104 is an application executable by the operating system. In some examples, the user device 102 is a laptop computer. In some examples, the user device 102 is a desktop computer. In some examples, the user device 102 is a tablet computer. In some examples, the user device 102 is a smartphone. In some examples, the user device 102 is a wearable device. In some examples, the display 105 is the display of the user device 102. In some examples, the display 105 may also include one or more external monitors that are connected to the user device 102.

The processor(s) 113 may be formed in a substrate configured to execute one or more machine executable instructions or pieces of software, firmware, or a combination thereof. The processor(s) 113 can be semiconductor-based—that is, the processors can include semiconductor material that can perform digital logic. The memory device(s) 115 may include a main memory that stores information in a format that can be read and/or executed by the processor(s) 113. The memory device(s) 115 may store the application 104 and/or the browser application 106 (and, in some examples, the language model 151) that, when executed by the processors 113, perform certain operations discussed herein. In some examples, the memory device(s) 115 includes a non-transitory computer-readable medium that includes executable instructions that cause at least one processor (e.g., the processors 113) to execute operations.

The server computer(s) 160 may be computing devices that take the form of a number of different devices, for example a standard server, a group of such servers, or a rack server system. In some examples, the server computer(s) 160 may be a single system sharing components such as processors and memories. In some examples, the server computer(s) 160 may be multiple systems that do not share processors and memories. The network 150 may include the Internet and/or other types of data networks, such as a local area network (LAN), a wide area network (WAN), a cellular network, satellite network, or other types of data networks. The network 150 may also include any number of computing devices (e.g., computers, servers, routers, network switches, etc.) that are configured to receive and/or transmit data within network 150. Network 150 may further include any number of hardwired and/or wireless connections.

The interface-guided diffusion model 152 and, in some examples, the language model 151, are executable by one or more server computers 160. The language model 151 may be a large language model configured to answer language queries about general topics. For example, the language model 151 may be a generic, pre-trained neural-network based model configured to understand, summarize, generate, and predict new content for a given user-generated query. In some examples, the system 100 does not include a separate language model 151. In some examples, the interface-guided diffusion model 152 and the language model 151 are separate models. In some examples, the interface-guided diffusion model 152 and the language model 151 form a single language model but represent two different subroutines of a common language model.

The server computer(s) 160 may include one or more processors 161 formed in a substrate, an operating system (not shown) and one or more memory devices 163. The memory device(s) 163 may represent any kind of (or multiple kinds of) memory (e.g., RAM, flash, cache, disk, tape, etc.). In some examples (not shown), the memory devices may include external storage, e.g., memory physically remote from but accessible by the server computer(s) 160. The processor(s) 161 may be formed in a substrate configured to execute one or more machine executable instructions or pieces of software, firmware, or a combination thereof. The processor(s) 161 can be semiconductor-based—that is, the processors can include semiconductor material that can perform digital logic. The memory device(s) 163 may store information in a format that can be read and/or executed by the processor(s) 161. The memory device(s) 163 may store the interface-guided diffusion model 152, and, in some examples, the language model 151 that, when executed by the processor(s) 161, perform certain operations discussed herein. In some examples, the memory device(s) 163 includes a non-transitory computer-readable medium that includes executable instructions that cause at least one processor (e.g., the processor(s) 161) to execute operations.

Figure 2:
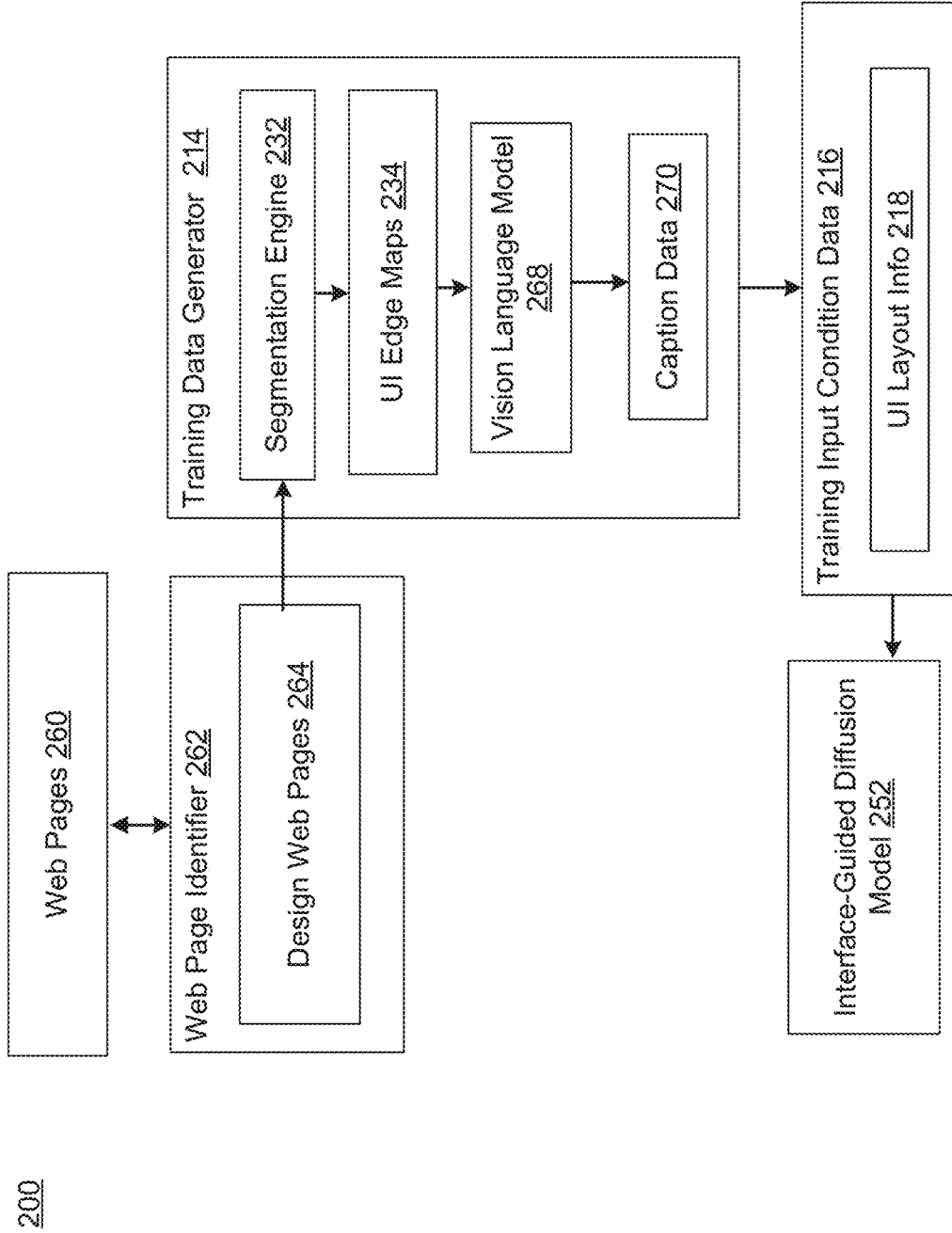
FIG. 2 illustrates a system for generating training data for the interface-guided diffusion model according to an aspect.

FIG. 2 illustrates a system 200 configured to generate training input condition data 216 to train an interface-guided diffusion model 252 to generate UI-compatible output images. The interface-guided diffusion model 252 may be an example of the interface-guided diffusion model 252 and may include any of the features discussed herein. In some examples, the system 200 may identify design web pages 264, obtain UI edge maps 234 from the design web pages 264, and generate the training input condition data 216 from the UI edge maps 234. The training input condition data 216 includes UI layout information 218 for the UI edge maps 234. The UI layout information 218 may include any of the information described with reference to the UI layout information 118 of FIGS. 1A to 1F. In some examples, the UI layout information 218 may include information that indicates a size and/or location of a UI element in a UI edge map 234.

The system 200 may include a web page identifier 262 configured to identify design web pages 264 from a plurality of web pages 260 on the Internet. For example, the web page identifier 262 may use a search index to search and identify relevant design web pages 264 on the Internet. The criteria according to which the web page identifier 262 identifies design web pages 264 are technical and identify, for example, web-pages with UI-elements and a UI layout that follow guidelines and patterns that are known to be advantageous in terms of usability. The identification as to whether a web page 260 meets the criteria of a design web page 264 can, for example, be based on the style sheet underlying the web page 260. The system 200 may include a training data generator 214 configured to generate the training input condition data 216 from the design web pages 264. In some examples, the training data generator 214 includes a segmentation engine 232 configured to generate a UI edge map 234 from a design web page 264 identified by the web page identifier 262. In some examples, the segmentation engine 232 may execute an edge detection algorithm to create a UI edge map 234. In some examples, the UI edge map 234 is a visual representation of an interface that includes representations (e.g., boxes) of the UI elements positioned at various locations in the interface. In some examples, the segmentation engine 232 detects the position and size of the boundaries of the UI elements from the design web pages 264. In some examples, the training data generator 214 may include a vision language model 268 (e.g., an image-to-text language model) configured to generate caption data 270 from a UI edge map 234. In some examples, the caption data 270 may include the position and size information and other information about the UI edge map 234.

Figure 3:
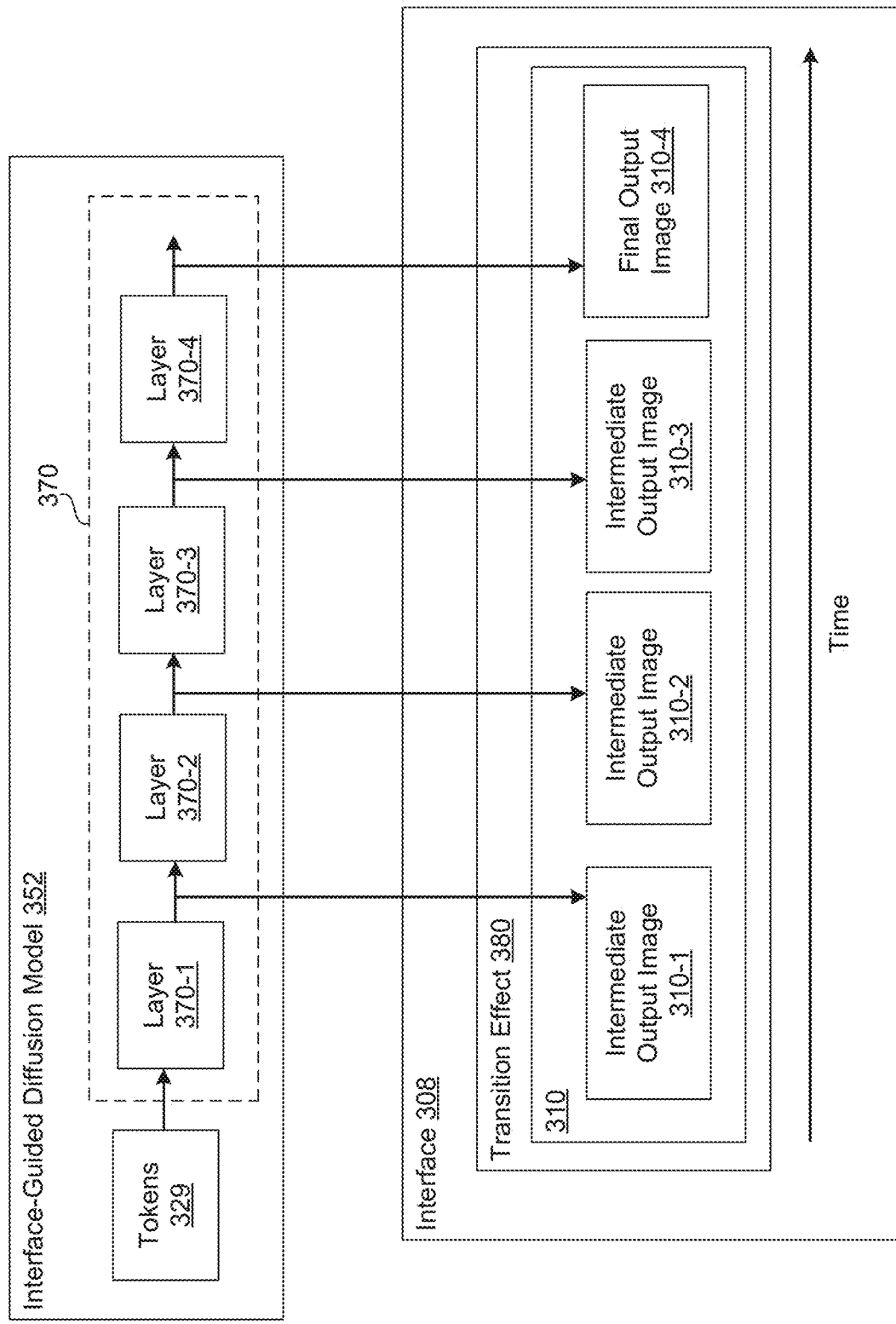
FIG. 3 illustrates a transition effect of rendering intermediate output images until a final output image is generated according to an aspect.

FIG. 3 illustrates a transition effect 380 for displaying a UI-compatible output image 310, generated by an interface-guided diffusion model 352, on an interface 308 of an application. The interface-guided diffusion model 352 may be an example of the interface-guided diffusion model 152 of FIGS. 1A to 1F and/or the interface-guided diffusion model 252 of FIG. 2 and may include any of the details discussed with reference to those figures. In some examples, generating a UI-compatible output image 310 from the interface-guided diffusion model 352 using the input condition data and the user-generated text may be relatively quick, where a final output image 310-4 is created relatively quickly. In some examples, generating a UI-compatible output image 310 from the interface-guided diffusion model 352 using the input condition data and the user-generated text may involve a relatively long processing time (e.g., thirty seconds, one minute, five minutes, etc.). In some examples, the application is configured to receive and display intermediate output images (e.g., intermediate output image 310-1, intermediate output image 310-2, intermediate output image 310-3) on the interface 308 as a transition effect 380 before a final output image 310-4 is displayed) so that the user can view the evolution of the UI-compatible output image 310.

The interface-guided diffusion model 352 may include a plurality of layers 370. The plurality of layers 370 may include a layer 370-1, a layer 370-2, a layer 370-3, and a layer 370-4. Although four layers are depicted in FIG. 3, the interface-guided diffusion model 352 may include any number of layers 370. Over time, the layers 370 may sequentially refine the UI-compatible output image 310 until a final output image 310-4 is generated. Instead of waiting until the process is completed to apply the UI-compatible output image 310 to the interface 308, the application may render intermediate output images as the UI-compatible output image 310 is being generated.

For example, the interface-guided diffusion model 352 may receive tokens 329 that represent the user-generated text and the input condition data. The layer 370-1 may use the tokens 329 to generate an intermediate output image 310-1, and the intermediate output image 310-1 is provided as an input to the subsequent layer (e.g., the layer 370-2). After the intermediate output image 310-1 is generated, the interface-guided diffusion model 352 may provide the intermediate output image 310-1 to the application, which causes the intermediate output image 310-1 to be displayed in the interface 308. The layer 370-2 may use the intermediate output image 310-1 to generate an intermediate output image 310-2, and the intermediate output image 310-2 is provided as an input to the subsequent layer (e.g., the layer 370-3). The intermediate output image 310-2 may be a further refinement of the intermediate output image 310-1. After the intermediate output image 310-2 is generated, the interface-guided diffusion model 352 may provide the intermediate output image 310-2 to the application, which causes the intermediate output image 310-2 to be displayed in the interface 308 (e.g., replaces the intermediate output image 310-1).

The layer 370-3 may use the intermediate output image 310-2 to generate an intermediate output image 310-3, and the intermediate output image 310-3 is provided as an input to the subsequent layer (e.g., the layer 370-4). The intermediate output image 310-3 may be a further refinement of the intermediate output image 310-2. After the intermediate output image 310-3 is generated, the interface-guided diffusion model 352 may provide the intermediate output image 310-3 to the application, which causes the intermediate output image 310-3 to be displayed in the interface 308 (e.g., replaces the intermediate output image 310-2). The layer 370-4 may use the intermediate output image 310-3 to generate a final output image 310-4. The final output image 310-4 may be a further refinement of the intermediate output image 310-3. After the final output image 310-4 is generated, the interface-guided diffusion model 352 may provide the final output image 310-4 to the application, which causes the final output image 310-4 to be displayed in the interface 308 (e.g., replaces the intermediate output image 310-3).

Figure 4:
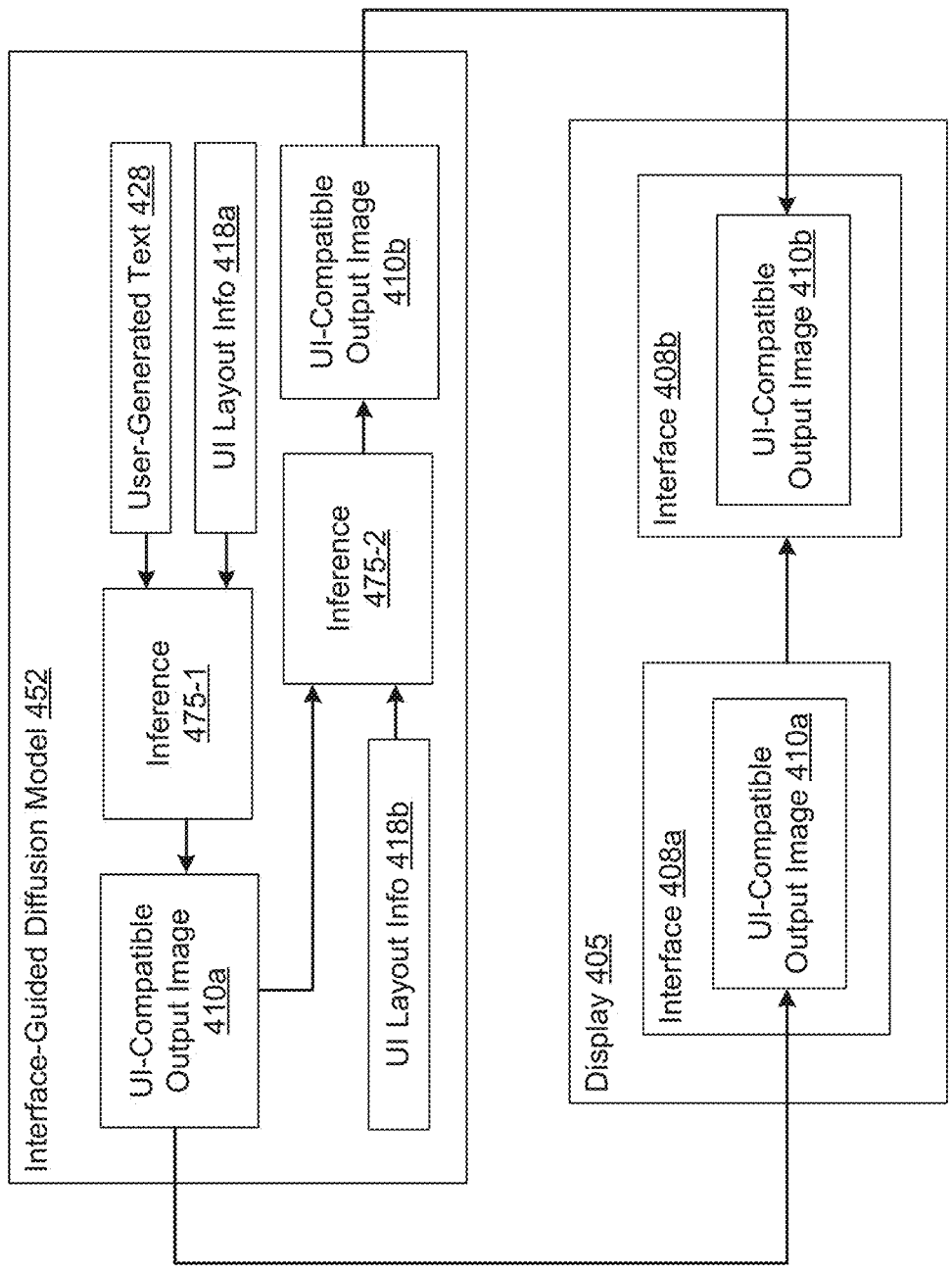
FIG. 4 illustrates an example of generating and rendering different UI-compatible output images for different interfaces according to an aspect.

FIG. 4 illustrates an example of generating and displaying related UI-compatible output images (e.g., UI-compatible output image 410a, UI-compatible output image 410b) for different interfaces (e.g., interface 408a, interface 408b) on a display 405. For example, when an interface 408a is rendered, a UI-compatible output image 410a may be displayed in the interface 408a that conforms to the UI elements of the interface 408a. When an interface 408b is rendered, a UI-compatible output image 410b may be displayed in the interface 408b that conforms to the UI elements of the interface 408b. In some examples, the UI-compatible output image 410b is different from (but related to) the UI-compatible output image 410a.

The application may generate one or more prompts that include user-generated text 428 (e.g., "create an image of a forest with deer) and UI layout information 418a about UI elements included on the interface 408a. In response to receiving the prompt(s), an interface-guided diffusion model 452 may execute an inference 475-1 to generate a UI-compatible output image 410a that accounts for the UI elements included on the interface 408a. The interface-guided diffusion model 452 may provide the UI-compatible output image 410a to the application to be displayed in the interface 408a. In some examples, the UI-compatible output image 410a is a background image. In some examples, the application updates a setting of the application to indicate that the UI-compatible output image 410a is the background image. In some examples, the UI-compatible output image 410a is a background image for a new tab page in a browser tab.

In some examples, the application may render an interface 408b. In some examples, the interface 408b is rendered in response to user interaction detected on the interface 408a. In some examples, the interface 408b is a different interface.

In some examples, the interface 408b includes one or more UI elements that are different from the UI elements on the interface 408a. Before the interface 408b is rendered, the interface-guided diffusion model 452 may execute an inference 475-2 to generate a UI-compatible output image 410b that accounts for the UI elements included on the interface 408b. For example, the interface-guided diffusion model 452 may generate the UI-compatible output image 410b using the UI-compatible output image 410a and the UI layout information 418b as inputs. The UI-compatible output image 410b may be related to the UI-compatible output image 410a because the interface-guided diffusion model 452 receives the UI-compatible output image 410a as an input condition. In some examples, the interface-guided diffusion model 452 may receive a seed of the UI-compatible output image 410a, and use the seed (along with the UI layout information 418b) to generate the UI-compatible output image 410. A seed is a series of numbers that informs the interface-guided diffusion model 452 how to generate an image (e.g., a blueprint for a work of art). The seed may guide the interface-guided diffusion model 452 as the interface-guided diffusion model 452 creates new and unique imagery. Instead of using a random seed to generate a new image, the interface-guided diffusion model 452 uses the seed of the UI-compatible output image 410a, which may form the base image, which the interface-guided diffusion model 452 uses to create a new (but related) image.

Figure 5:
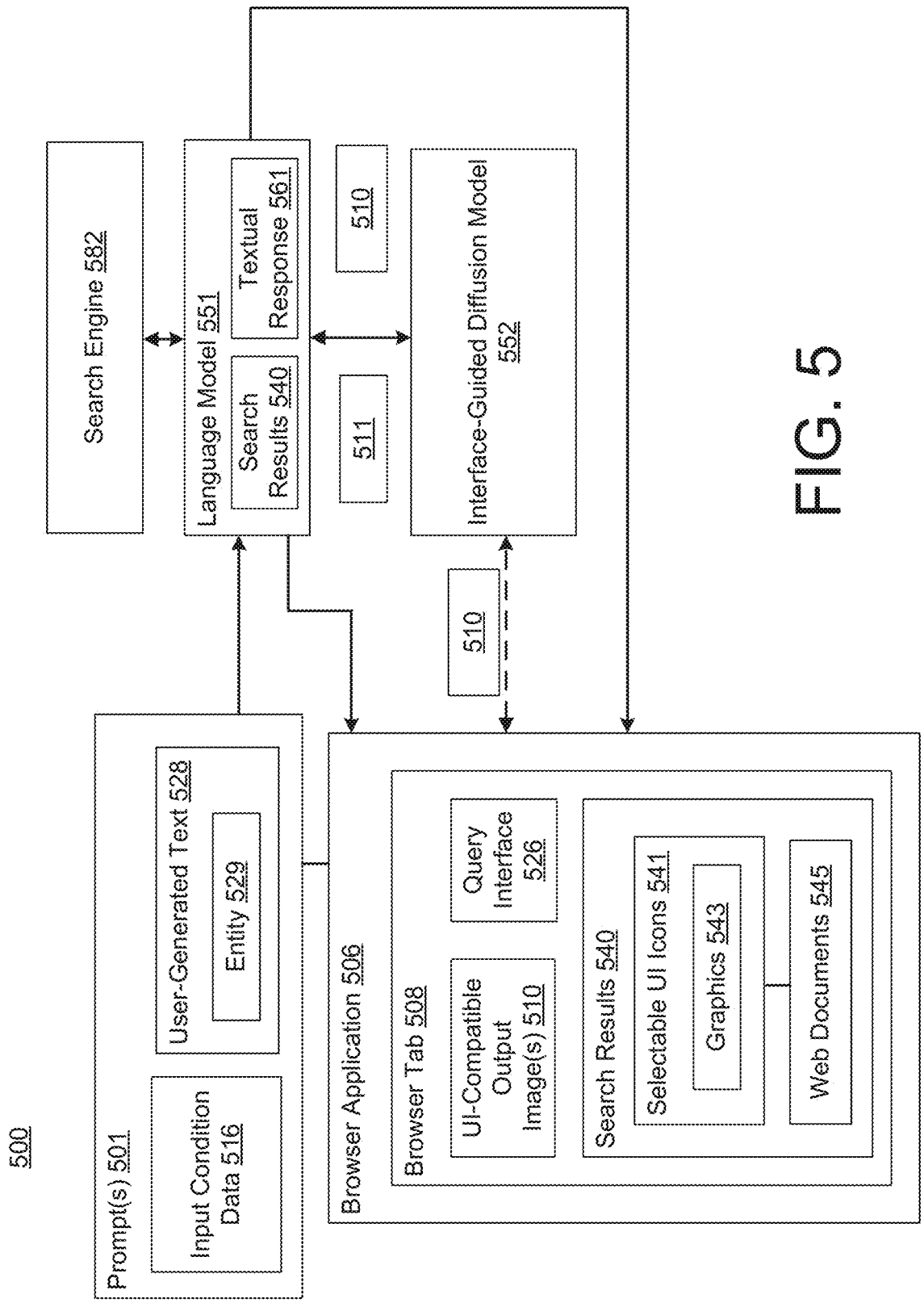
FIG. 5 illustrates an example of displaying a UI-compatible output image with search results according to an aspect.

FIG. 5 illustrates a system 100 configured to render search results 540 and UI-compatible output image(s) 510 in a browser tab 508 of a browser application 506. The system 500 may be an example of the system 100 of FIGS. 1A to 1F and may include any of the details discussed with reference to those figures. The browser tab 508 may display a query interface 526 associated with a language model 551. In some examples, the browser tab 508 displays a new tab page, and the query interface 526 is provided on the new tab page.

The language model 551 may be a large language model configured to answer language queries about general topics. For example, the language model 551 may be a generic, pre-trained neural-network based model configured to understand, summarize, generate, and predict new content for given user-generated text 528. In some examples, the language model 551 may operate with a search engine 582 to identify search results 540 that are responsive to the user-generated text 528.

A user can ask the language model 551 a variety of different types of questions (e.g., "what are some good restaurants in Milwaukee"). The browser application 506 may generate one or more prompts 501 that includes input condition data 516 and user-generated text 528. The user-generated text 528 may include a search query (e.g., "what are some good restaurants in Milwaukee"). The browser application 506 may transmit the prompt(s) 501 to the language model 551. The language model 551 may communicate with a search engine 582 to identify search results 540 related to the user-generated text 528. In some examples, the language model 551 may generate a textual response 561 that responds to the user-generated text 528. The browser application 506 may receive and display the textual response 561 and the search results 540 in the browser tab 508.

In some examples, the language model 551 may detect an entity 529 (e.g., "Milwaukee") mentioned in the user-generated text 528 and communicate with an interface-guided diffusion model 552 to generate a UI-compatible output image 510 about the entity 529. The entity 529 may be a person, place, item, idea, concept, etc. In some examples, the language model 551 may generate a prompt 511 that includes a textual description, generated by the language model 551, for an image to be created (e.g., "create an image of Milwaukee", or "Milwaukee's restaurant district", etc.). In some examples, the prompt 511 also includes the input condition data 516. In response to the prompt 511, the interface-guided diffusion model 552 may generate a UI-compatible output image 510 that accounts for the UI elements in the browser tab 508. In some examples, the interface-guided diffusion model 552 may return the UI-compatible output image 510 to the language model 551, and the language model 551 may provide the search results 540, the textual response 561, and the UI-compatible output image 510 to the browser application 506. In some examples, the UI-compatible output image 510 may be displayed in a portion of the browser tab 508.

In some examples, the search results 540 include selectable UI icons 541 corresponding to the web documents 545. A selectable UI icon 541, when selected, causes the corresponding web document 545 to be displayed in the browser tab 508. Along with each selectable UI icon 541, the search results 540 may include a title of the web document 545, a short snippet from the web document 545, and/or other information related to the web document 545. In some examples, the interface-guided diffusion model 552 may generate a graphic 543 for the selectable UI icon 541. For example, with respect to a particular selectable UI icon 541, the interface-guided diffusion model 552 may receive one or more images associated with the web document 545 and create a graphic 543 for the selectable UI icon 541. In some examples, the interface-guided diffusion model 552 may return the graphics 543 to the language model 551, and the language model 551 may provide the graphics 543 and the search results 540 to the browser application 506 for display.

Figure 6:
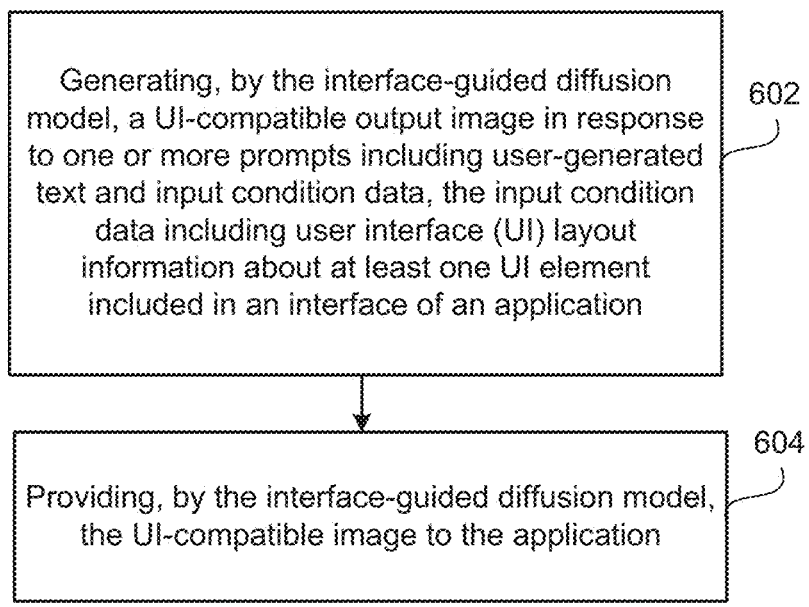
FIG. 6 is a flowchart depicting example operations of generating a UI-compatible output image according to an aspect.

FIG. 6 is a flowchart 600 depicting example operations of a system that uses an interface-guided diffusion model to convert user-generated text into a UI-compatible output image for use in an interface of an application. The flowchart 600 may depict operations of a computer-implemented method. Although the flowchart 600 is explained with respect to the system 100 of FIGS. 1A through 1F, the flowchart 600 may be applicable to any of the implementations discussed herein. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion. The flowchart 600 may depict a computer-implemented method.

The flowchart 600 discussed herein may overcome one or more technical problems relating to the use of generative machine-learning (ML) images within an application's interface that includes UI elements (e.g., icons, controls, input fields, etc.) that are positioned in fixed locations in the interface. The interface-guided diffusion model may use UI layout information of the interface as an input condition to generate a UI-compatible output image that accounts for the UI elements, which may increase the discoverability of UI elements on the interface.

Operation 602 includes generating, by an interface-guided diffusion model 152, a UI-compatible output image 110 in response to one or more prompts 101 including user-generated text 128 and input condition data 116, the input condition data 116 including user interface (UI) layout information 118 about at least one UI element 112 included in an interface 108 of an application 104. Operation 604 includes providing the UI-compatible output image 110 to the application 104.

In some examples, the operations include generating, by an interface-guided diffusion model, a UI-compatible output image in response to one or more prompts including user-generated text and input condition data, the input condition data including user interface (UI) layout information about at least one UI element included in an interface of an application; and providing the UI-compatible output image to the application. In some examples, the operations include identifying design web pages from a plurality of web pages; generating training input condition data from the design web pages; and training the interface-guided diffusion model based on the training input condition data. In some examples, generating the training input condition data from the design web pages includes generating a UI edge map from a design web page, the training input condition data including the UI edge map. In some examples, generating the training input condition data from the design web pages further includes: generating caption data from at least one of the UI edge map or the design web page, the caption data including information about one or more UI elements included on the UI edge map, the training input condition data including the UI edge map and the caption data.

In some examples, the input condition data includes activation of a color vision deficiency setting, wherein generating the UI-compatible output image includes: generating, by the interface-guided diffusion model, the UI-compatible output image with a monochromatic color scheme. In some examples, the input condition data includes display screen information about one or more display attributes of a display screen, wherein generating the UI-compatible output image includes: generating, by the interface-guided diffusion model, the UI-compatible output image based on the display screen information. In some examples, the operations include generating, by the interface-guided diffusion model, intermediate output images; and providing, by the interface-guided diffusion model, the intermediate output images for display in the interface until a final output image is generated. In some examples, the interface is a first interface, the UI layout information is first UI layout information, and the UI-compatible output image is a first UI-compatible output image, and the operations include receiving, by the interface-guided diffusion model, second UI layout information about at least one UI element on a second interface of the application; generating, by the interface-guided diffusion model, a second UI-compatible output image based on the first UI-compatible output image and the second UI layout information; and providing, by the interface-guided diffusion model, the second UI-compatible output image to the application for display in the second interface of the application. In some examples, the interface is a new tab page of a browser tab. In some examples, the user-generated text includes a natural language description about an image to be created using the interface-guided diffusion model. In some examples, the user-generated text includes a search query about an entity, where the UI-compatible output image includes image data relating to the entity. In some examples, the UI layout information is obtained from a resource address provided with the user-generated text.

Figure 7:
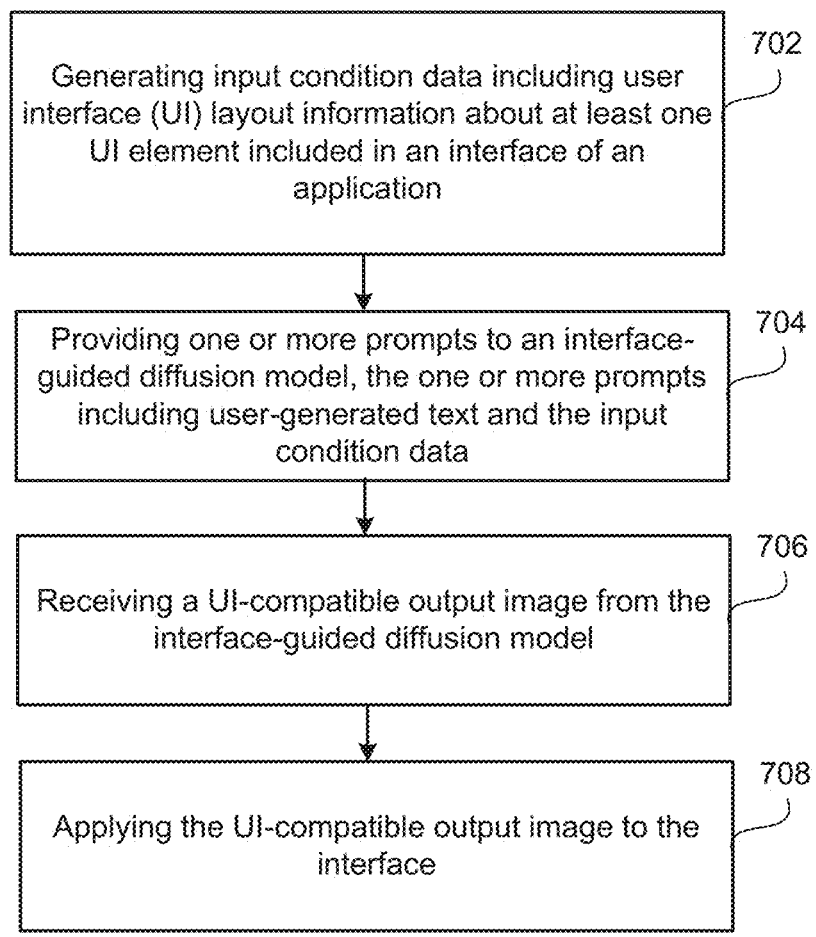
FIG. 7 is a flowchart depicting example operations of rendering a UI-compatible output image in an application according to an aspect.

FIG. 7 is a flowchart 700 depicting example operations of a system that uses an interface-guided diffusion model to convert user-generated text into a UI-compatible output image for use in an interface of an application. The flowchart 700 may depict operations of a computer-implemented method. Although the flowchart 700 is explained with respect to the system 100 of FIGS. 1A through 1F, the flowchart 700 may be applicable to any of the implementations discussed herein. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion. The flowchart 700 may depict a computer-implemented method.

The flowchart 700 discussed herein may overcome one or more technical problems relating to the use of generative machine-learning (ML) images within an application's interface that includes UI elements (e.g., icons, controls, input fields, etc.) that are positioned in fixed locations in the interface. The interface-guided diffusion model may use UI layout information of the interface as an input condition to generate a UI-compatible output image that accounts for the UI elements, which may increase the discoverability of UI elements on the interface.

Operation 702 includes generating input condition data 116 including user interface (UI) layout information 118 about at least one UI element 112 included in an interface 108 of an application 104. Operation 704 includes providing one or more prompts 101 to an interface-guided diffusion model 152, the one or more prompts 101 including user-generated text 128 and the input condition data 116. Operation 706 includes receiving a UI-compatible output image 110 from the interface-guided diffusion model 152. Operation 708 includes applying the UI-compatible output image 110 to the interface 108.

In some examples, the operations include generating input condition data including user interface (UI) layout information about at least one UI element included in an interface of an application; providing one or more prompts to an interface-guided diffusion model, the one or more prompts including user-generated text and the input condition data; receiving a UI-compatible output image from the interface-guided diffusion model; and applying the UI-compatible output image to the interface. In some examples, the operations include generating the UI layout information based on a structural description associated with the interface. In some examples, the operations include displaying intermediate output images generated by the interface-guided diffusion model until a final output image is displayed. In some examples, the interface is a first interface, the UI layout information is first UI layout information, and the UI-compatible output image is a first UI-compatible output image, and the operations include transmitting second UI layout information about at least one UI element on a second interface of the application; receiving a second UI-compatible output image generated by the interface-guided diffusion model using the first UI-compatible output image and the second UI layout information; and applying the second UI-compatible output image to the second interface.

Clause 1. A method comprising: generating, by an interface-guided diffusion model, a UI-compatible output image in response to one or more prompts including user-generated text and input condition data, the input condition data including user interface (UI) layout information about at least one UI element included in an interface of an application; and providing the UI-compatible output image to the application.

Clause 2. The method of clause 1, further comprising: identifying design web pages from a plurality of web pages; generating training input condition data from the design web pages; and training the interface-guided diffusion model based on the training input condition data.

Clause 3. The method of clause 2, wherein generating the training input condition data from the design web pages includes: generating a UI edge map from a design web page, the training input condition data including the UI edge map.

Clause 4. The method of clause 3, wherein generating the training input condition data from the design web pages further includes: generating caption data from at least one of the UI edge map or the design web page, the caption data including information about one or more UI elements included on the UI edge map, the training input condition data including the UI edge map and the caption data.

Clause 5. The method of any of clauses 1 to 4, wherein the input condition data includes activation of a color vision deficiency setting, wherein generating the UI-compatible output image includes: generating, by the interface-guided diffusion model, the UI-compatible output image with a monochromatic color scheme.

Clause 6. The method of any of clauses 1 to 5, wherein the input condition data includes display screen information about one or more display attributes of a display screen, wherein generating the UI-compatible output image includes: generating, by the interface-guided diffusion model, the UI-compatible output image based on the display screen information.

Clause 7. The method of any of clauses 1 to 6, further comprising: generating, by the interface-guided diffusion model, intermediate output images; and providing, by the interface-guided diffusion model, the intermediate output images for display in the interface until a final output image is generated.

Clause 8. The method of any of clauses 1 to 7, wherein the interface is a first interface, the UI layout information is first UI layout information, and the UI-compatible output image is a first UI-compatible output image, the method further comprising: receiving, by the interface-guided diffusion model, second UI layout information about at least one UI element on a second interface of the application; generating, by the interface-guided diffusion model, a second UI-compatible output image based on the first UI-compatible output image and the second UI layout information; and providing, by the interface-guided diffusion model, the second UI-compatible output image to the application for display in the second interface of the application.

Clause 9. The method of any of clauses 1 to 8, wherein the interface is a new tab page of a browser tab.

Clause 10. The method of any of clauses 1 to 9, wherein the user-generated text includes a natural language description about an image to be created using the interface-guided diffusion model.

Clause 11. The method of any of clauses 1 to 10, wherein the user-generated text includes a search query about an entity, wherein the UI-compatible output image includes image data relating to the entity.

Clause 12. The method of any of clauses 1 to 11, wherein the UI layout information is obtained from a resource address provided with the user-generated text.

Clause 13. A non-transitory computer-readable medium storing executable instructions that when executed by at least one processor cause the at least one processor to execute operations, the operations comprising: generating input condition data including user interface (UI) layout information about at least one UI element included in an interface of an application; providing one or more prompts to an interface-guided diffusion model, the one or more prompts including user-generated text and the input condition data; receiving a UI-compatible output image from the interface-guided diffusion model; and applying the UI-compatible output image to the interface.

Clause 14. The non-transitory computer-readable medium of clause 13, wherein the operations further comprise: generating the UI layout information based on a structural description associated with the interface.

Clause 15. The non-transitory computer-readable medium of clause 13 or 14, wherein the operations further comprise: displaying intermediate output images generated by the interface-guided diffusion model until a final output image is displayed.

Clause 16. The non-transitory computer-readable medium of any of clauses 13 to 15, wherein the interface is a first interface, the UI layout information is first UI layout information, and the UI-compatible output image is a first UI-compatible output image, the operations further comprising: transmitting second UI layout information about at least one UI element on a second interface of the application; receiving a second UI-compatible output image generated by the interface-guided diffusion model using the first UI-compatible output image and the second UI layout information; and applying the second UI-compatible output image to the second interface.

Clause 17. An apparatus comprising: at least one processor; and a non-transitory computer-readable medium storing executable instructions that cause the at least one processor to: receive one or more prompts that includes user-generated text and input condition data, the input condition data including user interface (UI) layout information about at least one UI element included in an interface of an application; in response to the one or more prompts, generate a UI-compatible output image; and provide the UI-compatible output image to the application.

Clause 18. The apparatus of clause 17, wherein the executable instructions include instructions that cause the at least one processor to: identify design web pages from a plurality of web pages; generate training input condition data from the design web pages; and train an interface-guided diffusion model based on the training input condition data.

Clause 19. The apparatus of clause 18, wherein the executable instructions include instructions that cause the at least one processor to: generate a UI edge map from a design web page, the training input condition data including the UI edge map.

Clause 20. The apparatus of clause 19, wherein the executable instructions include instructions that cause the at least one processor to: generate caption data from the UI edge map, the caption data including information about one or more UI elements included on the UI edge map, the training input condition data including the UI edge map and the caption data.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:
   generating, by a model, an output image in response to one or more prompts including user-generated text and input condition data, the input condition data including user interface (UI) layout information about at least one UI element included in an interface of an application, the UI layout information being obtained from a resource address provided with the user-generated text; and
   providing the output image to the application.

2. The method of claim 1, further comprising:
   identifying design web pages from a plurality of web pages;
   generating training input condition data from the design web pages; and
   training the model based on the training input condition data.

3. The method of claim 2, wherein generating the training input condition data from the design web pages includes:
   generating a UI edge map from a design web page, the training input condition data including the UI edge map.

4. The method of claim 3, wherein generating the training input condition data from the design web pages further includes:
   generating caption data from at least one of the UI edge map or the design web page, the caption data including information about one or more UI elements included on the UI edge map, the training input condition data including the UI edge map and the caption data.

5. The method of claim 1, wherein the input condition data includes activation of a color vision deficiency setting, wherein generating the output image includes:
   generating, by the model, the output image with a monochromatic color scheme.

6. The method of claim 1, wherein the input condition data includes display screen information about one or more display attributes of a display screen, wherein generating the output image includes: generating, by the model, the output image based on the display screen information.

7. The method of claim 1, further comprising:
   generating, by the model, intermediate output images; and
   providing, by the model, the intermediate output images for display in the interface until a final output image is generated.

8. The method of claim 1, wherein the interface is a first interface, the UI layout information is first UI layout information, and the output image is a first output image, the method further comprising:
- receiving, by the model, second UI layout information about at least one second UI element on a second interface of the application;
- generating, by the model, a second output image based on the first output image and the second UI layout information; and
- providing, by the model, the second output image to the application for display in the second interface of the application.

9. The method of claim 1, wherein the interface is a new tab page of a browser tab.

10. The method of claim 1, wherein the user-generated text includes a natural language description about an image to be created using the model.

11. The method of claim 1, wherein the user-generated text includes a search query about an entity, wherein the output image includes image data relating to the entity.

12. A non-transitory computer-readable medium storing executable instructions that when executed by at least one processor cause the at least one processor to execute operations, the operations comprising:
- generating input condition data including user interface (UI) layout information about at least one UI element included in an interface of an application, the interface being a new tab page of a browser;
- providing one or more prompts to a model, the one or more prompts including user-generated text and the input condition data;
- receiving an output image from the model; and
- applying the output image to the interface.

13. The non-transitory computer-readable medium of claim 12, wherein the operations further comprise:
- generating the UI layout information based on a structural description associated with the interface.

14. The non-transitory computer-readable medium of claim 12, wherein the operations further comprise:
- displaying intermediate output images generated by the model until a final output image is displayed.

15. The non-transitory computer-readable medium of claim 12, wherein the interface is a first interface, the UI layout information is a first UI layout information, and the output image is a first output image, the operations further comprising:
- transmitting a second UI layout information about at least one UI element on a second interface of the application;
- receiving a second output image generated by the model using the first output image and the second UI layout information; and
- applying the second output image to the second interface.

16. An apparatus comprising:
- at least one processor; and
- a non-transitory computer-readable medium storing executable instructions that cause the at least one processor to:
  - receive one or more prompts that includes user-generated text and input condition data, the input condition data including user interface (UI) layout information about at least one UI element included in an interface of an application, and the input condition data including an attribute of a display screen;
  - in response to the one or more prompts, generate an output image; and
  - provide the output image to the application,
  - wherein the output image is generated based on the attribute.

17. The apparatus of claim 16, wherein the executable instructions include instructions that cause the at least one processor to:
- identify design web pages from a plurality of web pages;
- generate training input condition data from the design web pages; and
- train a model based on the training input condition data.

18. The apparatus of claim 17, wherein the executable instructions include instructions that cause the at least one processor to:
- generate a UI edge map from a design web page, the training input condition data including the UI edge map.

19. The apparatus of claim 18, wherein the executable instructions include instructions that cause the at least one processor to:
- generate caption data from the UI edge map, the caption data including information about one or more UI elements included on the UI edge map, the training input condition data including the UI edge map and the caption data.

* * * * *